United States Patent
Ishimaru et al.

(10) Patent No.: US 6,802,571 B2
(45) Date of Patent: Oct. 12, 2004

(54) PARKING BRAKE UNIT FOR WORK VEHICLE

(75) Inventors: Hideharu Ishimaru, Niihari-gun (JP); Toshihiko Shinya, Noda (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/363,667

(22) PCT Filed: Sep. 10, 2001

(86) PCT No.: PCT/JP01/07838

§ 371 (c)(1),
(2), (4) Date: Mar. 6, 2003

(87) PCT Pub. No.: WO02/20320

PCT Pub. Date: Mar. 14, 2002

(65) Prior Publication Data

US 2003/0173824 A1 Sep. 18, 2003

(30) Foreign Application Priority Data

Sep. 8, 2000 (JP) ........................................ 2000-273738

(51) Int. Cl.⁷ .............................................. F16H 61/12
(52) U.S. Cl. .............................. 303/3; 475/83; 475/141; 192/219.4
(58) Field of Search ................................ 303/3, 15, 20; 475/82, 83, 140, 141; 192/219.4, 219.6, 219.7

(56) References Cited

U.S. PATENT DOCUMENTS

| 5,306,215 | A | * | 4/1994 | Mann et al. ................... 475/83 |
| 5,779,586 | A | * | 7/1998 | Gebhard et al. ............ 475/140 |
| 5,839,984 | A | * | 11/1998 | Mann et al. ................... 475/83 |
| 5,890,982 | A | * | 4/1999 | Meyerle ....................... 475/72 |
| 6,432,016 | B1 | * | 8/2002 | Heilig .......................... 475/140 |

FOREIGN PATENT DOCUMENTS

| JP | U 58-80649 | 5/1983 |
| JP | U 64-29064 | 2/1989 |
| JP | A 3-292447 | 12/1991 |
| JP | A 4-321464 | 11/1992 |
| JP | U 6-3765 | 1/1994 |

* cited by examiner

Primary Examiner—Christopher P. Schwartz
(74) Attorney, Agent, or Firm—Oliff & Berridge, PLC

(57) ABSTRACT

A brake release unit is provided between a transmission control unit for controlling a transmission and a clutch device. Pressure oil supplied from a hydraulic pressure source to the clutch device is also guided to an accumulator of the brake release unit. When the engine is stopped, pressure oil from the clutch device is collected in a reservoir, and the transmission operates as a parking brake. Pressure oil accumulated in the accumulator is kept as it is. If a solenoid switching valve of the brake release unit is driven as a result of operation of a switch in the operator's cabin, pressure oil accumulated in the accumulator is supplied to the clutch device. As a result, it is possible to easily release the parking brake.

9 Claims, 4 Drawing Sheets

PARKING BRAKE UNIT FOR WORK VEHICLE

The present application is based on Japanese patent application No. 2000-273738 (filed Sep. 8, 2000), the contents thereof are incorporated herein by reference.

TECHNICAL FIELD

The present invention relates to a parking brake unit for a work vehicle having a parking brake operated when the engine is stopped.

BACKGROUND ART

Conventionally, a negative parking brake has been provided in a work vehicle such as a wheeled hydraulic excavator or a wheel loader, in addition to a foot brake. Operation of this parking brake is released if release pressure is supplied from a hydraulic source after an engine has been started, and the parking brake is operated if supply of the release pressure is stopped when the engine is stopped.

In the case where an engine can not be started, such as because of vehicle failure etc., the vehicle shall be towed to a specified location. In this case, if the parking brake is kept operating, it becomes difficult to tow the vehicle away. For this reason, it is necessary to allow the parking brake to be released even if the engine is stopped. In the related art, the parking brake is released by operating a release lever or the like at outside of the operator's cabin, which is provided close to the parking brake. However, it is troublesome to release the parking brake manually at outside of the operator's cabin. Also, in the case where the release lever for the parking brake is provided at a place hidden from the view, operability is degraded.

DISCLOSURE OF THE INVENTION

The object of the present invention is to provide a parking brake unit for a work vehicle that releases a parking brake easily with an operation inside the operator's cabin, even when the engine is stopped.

In order to achieve the above described object, a parking brake unit for a work vehicle comprises a hydraulic source; a negative parking brake provided a lower portion of the vehicle, that releases brake operation in response to brake release pressure; an operating member that outputs a release command for the parking brake in response to operation performed in an operator's cabin; and a brake release means for releasing operation of the parking brake by leading the brake release pressure to the parking brake if the release command is output. And, the brake release means comprises a brake release accumulator that accumulates pressure oil from the hydraulic source, and a control valve that allows the pressure oil accumulated in the accumulator to act on the parking brake as the brake release pressure if the release command is output.

It is preferable that the parking brake is constituted by a transmission having a negative first clutch device and a negative second clutch device. The transmission sets a first gear ratio by allowing a propeller shaft to rotate if the first clutch device is released by control pressure for clutch release, and sets a second gear ratio smaller than the first gear ratio by allowing the propeller shaft to rotate if the second clutch device is released by the control pressure for clutch release. It is preferable that the control valve allows the pressure oil from the accumulator to act on the second clutch device as the brake release pressure if the release command is output. The control valve may allow the pressure oil from the accumulator to act on the first clutch device as the brake release pressure if the release command is output. The control valve may also allow the pressure oil from the accumulator to act on one of the first clutch device and the second clutch device as the brake release pressure if the release command is output.

It is also possible to further comprise a transmission control means, having a gear ratio control valve that controls flow of the control pressure for clutch release for acting on the first clutch device and the second clutch device, and a sudden operation prevention accumulator that prevents sudden operation of the parking brake, and the brake release means may be provided between the parking brake and the transmission control means.

It is desirable that the brake release means further comprises a prevention means for preventing the pressure oil accumulated in the accumulator flowing out to the hydraulic power side.

It is possible to further comprise a brake valve that generates brake operating pressure in correspondence with operation of a brake pedal; a foot brake unit that operates in response to the brake operating pressure; and a foot brake accumulator that accumulates specified pressure oil in order to generate the brake operating pressure in accordance with operation of the brake pedal when an engine is stopped. The foot brake accumulator may also function as the brake release accumulator.

In order to achieve the above described object, a parking brake unit for a work vehicle comprises a hydraulic source; a negative parking brake provided a lower portion of the vehicle, that releases brake operation in response to brake release pressure; an operating member that outputs a release command for the parking brake in response to operation performed in an operator's cabin; and a brake release means for releasing operation of the parking brake by leading the brake release pressure to the parking brake if the release command is output. The parking brake is constituted of a transmission having a negative first clutch device and a negative second clutch device. The transmission sets a first gear ratio by allowing a propeller shaft to rotate if the first clutch device is released by control pressure for clutch release, and sets a second gear ratio smaller than the first gear ratio by allowing the propeller shaft to rotate if the second clutch device is released by the control pressure for clutch release. It is preferable that the brake release means comprises a brake release accumulator that accumulates pressure oil from the hydraulic source, and a control valve that allows the pressure oil accumulated in the accumulator to be guided to the second clutch device as the brake release pressure if the release command is output.

As described above, if the release command is output in response to an operation performed in the operator's cabin, the brake release means allows the oil accumulated in the accumulator to flow, and leads the brake release pressure to the parking brake. Therefore, even if the engine is stopped, it is possible to release the parking brake through the operation in the operator's cabin.

If the brake release command is output, pressure oil acts on the first clutch device or the second clutch device so that a locked state of the transmission is released. In this manner, it is not necessary to provide the parking brake separately. Also, if the gear ratio of the transmission is set to a second gear ratio that is smaller than a first gear ratio set by the first clutch device by guiding the pressure oil to the second clutch device when the brake release command is output, a towing operation can be performed easily because drive torque of the motor at the time of parking brake release is small.

The brake release means is provided between the parking brake and the transmission control means. As a result, since the pressure oil does not flow from the brake release means to the transmission control means, it is possible to minimize the brake release accumulator.

Also, by using the pressure oil from the foot brake accumulator as the release pressure for the parking brake unit, it is possible to reduce the number of components.

BEST MODE FOR CARRYING OUT THE INVENTION

First Embodiment

Figure 4:
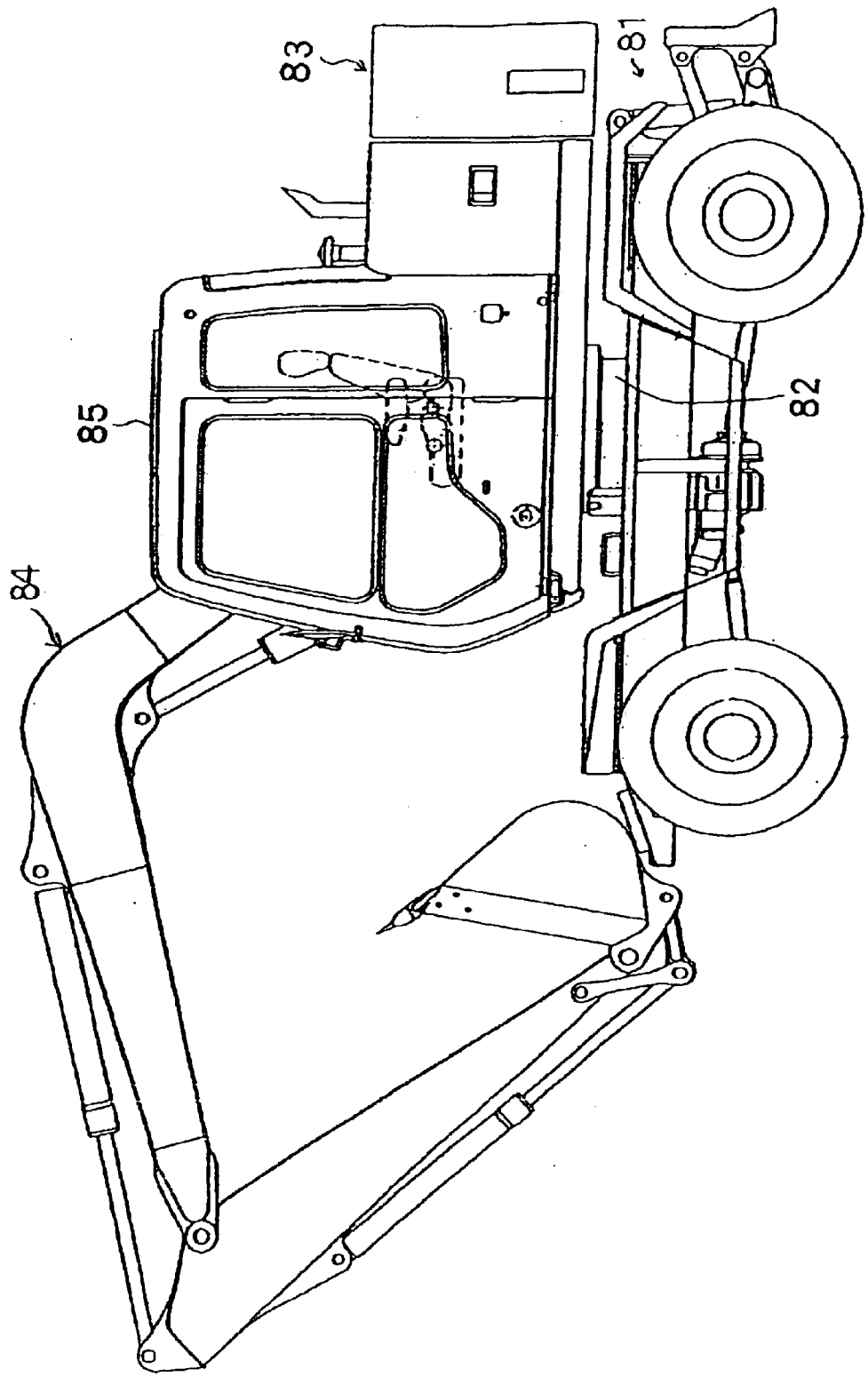
FIG. 4 is a side elevation of a wheeled hydraulic excavator to which the present invention applies.

A first embodiment of the present invention will now be described with reference to FIG. 1, FIG. 2 and FIG. 4. In the following, a description will be given for the case where the present invention is applied to a wheeled hydraulic excavator. FIG. 4 is a side elevation of a wheeled hydraulic excavator. The wheeled hydraulic excavator comprises an undercarriage 81, and an upper structure 83 connected to an upper part of the undercarriage 81 via a swing device 82 so as to be capable of revolving. A front attachment 84 for working and an operator's cabin 85 are provided on the upper structure 83.

Figure 1:
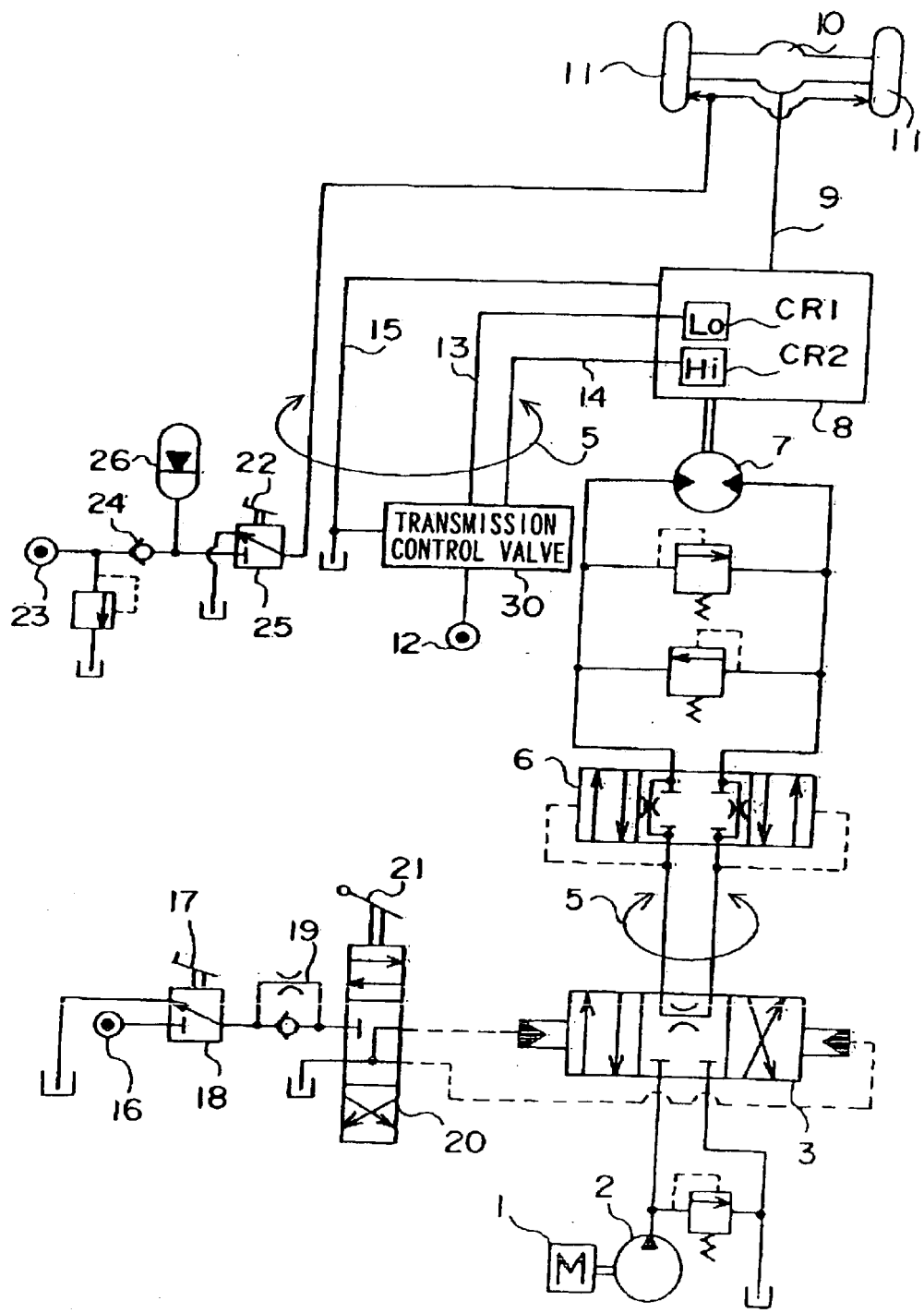
FIG. 1 is a hydraulic circuit diagram for traveling adapted in a work vehicle having the parking brake unit of this embodiment.

FIG. 1 is a hydraulic circuit diagram for traveling adapted in a wheeled hydraulic excavator to which the present invention is applied. As shown in FIG. 1, direction and flow amount of delivery oil from a main pump 2 driven by an engine (prime mover) 1 are respectively controlled by a control valve 3. Pressure oil whose direction and flow amount have been controlled passes through a center joint 5 and is supplied to a travel motor 7 via a counter balance valve 6. The rotation speed of the travel motor 7 is varied by a transmission 8, and transmitted via a propeller shaft 9 and axle 10 to tires 11. In this way, the wheeled hydraulic excavator travels.

The transmission 8 is a well-known device having a planetary reduction mechanism, and clutch devices CR1 and CR2. The planetary reduction mechanism comprises a sun gear, a planetary gear and a ring gear, with the clutch devices CR1 and CR2 being provided at the sun gear side and the ring gear side, respectively. Each of the clutch devices CR1 and CR2 is put into engaged states by force of a spring. Also, the clutch devices CR1 and CR2 are set to released states using hydraulic pressure from the hydraulic source 12 acting against the spring force. Hydraulic pressure acting on the clutch devices CR1 and CR2 is controlled in accordance with operation of the transmission control valve 30.

If specified hydraulic pressure acts on the clutch device CR1 via the pipeline 13 in response to drive of the transmission control valve 30, the clutch device CR1 is set to the released state and the clutch device CR2 is set to the engaged state. As a result, a specified gear ratio R1 is established and first gear travel becomes possible at low-speed high-torque.

If a specified hydraulic pressure acts on the clutch device CR2 via the pipeline 14 in response to drive of the transmission control valve 30, the clutch device CR2 is set to the released state and the clutch device CR1 is set to the engaged state. As a result, a specified gear ratio R2 is established and second gear travel is enabled at high-speed low-torque. Here, the gear ratio R1 for enabling low-speed high-torque is larger than the gear ratio R2 for enabling high-speed low-torque (R1>R2). The pipeline 15 is a return pipeline.

On the other hand, if hydraulic pressure does not act on either the clutch device CR1 or the clutch device CR2 both clutch devices CR1 and CR2 are set to the engaged state by the spring force. As a result, the transmission 8 is locked and rotation of the propeller shaft 9 is prevented. With this embodiment, prevention of rotation of the propeller shaft 9 achieved by locking the transmission 8 is used as a parking brake. That is, the transmission 8 is a spring applied hydraulic release parking brake or a negative parking brake that is released if the release pressure is supplied from the hydraulic source, and operated if supply of the release pressure is stopped.

A pilot circuit for traveling comprises a pilot hydraulic source 16, a travel pilot valve 18, a slow-return valve 19, and a forward and reverse switching valve 20. The pilot hydraulic source 16, similarly to the main pump 2, is driven by the engine (prime mover) 1 to generate pressure oil. The travel pilot valve 18 generates pilot secondary pressure in response to depression of the accelerator pedal 17. The slow-return valve 19 is connected with the pilot valve 18 and delays the oil returning to the pilot valve 18. The forward and reverse switching valve 20 is connected with the slow return valve 19 and is switched by an operating lever 21 to select forward, reverse or neutral of the vehicle travel.

Pilot pressure from the pilot hydraulic source 16 acts on the pilot port of the control valve 3 to drive the control valve 3. Vehicle travel speed can be adjusted by varying the stroke amount of the control valve 3 using the accelerator pedal 17.

A well-known foot brake is provided in the wheeled hydraulic excavator, which exerts deceleration force in response to operation of a brake pedal 22. A pilot circuit for this foot brake comprises a pilot hydraulic source 23 driven by the engine (prime mover) 1, similarly to the main pump 2, to generate pressure oil, a check valve 24, and a brake valve 25 for generating pilot secondary pressure in response to depression of the brake pedal 22. An accumulator 26 for accumulating specified pressure oil is also provided between the check valve 24 and the brake valve 25.

Specified pressure from the hydraulic source 23 driven by the engine (prime mover) 1 is accumulated in the accumulator 26. Even if the hydraulic source 23 stops supplying pressure oil because the engine is stopped etc., pressure oil is accumulated in the accumulator 26. Therefore, it is possible to cause the foot brake to be driven by operation of the pedal 22 for only a specified time using the pressure oil accumulated in the accumulator 26.

Figure 2:
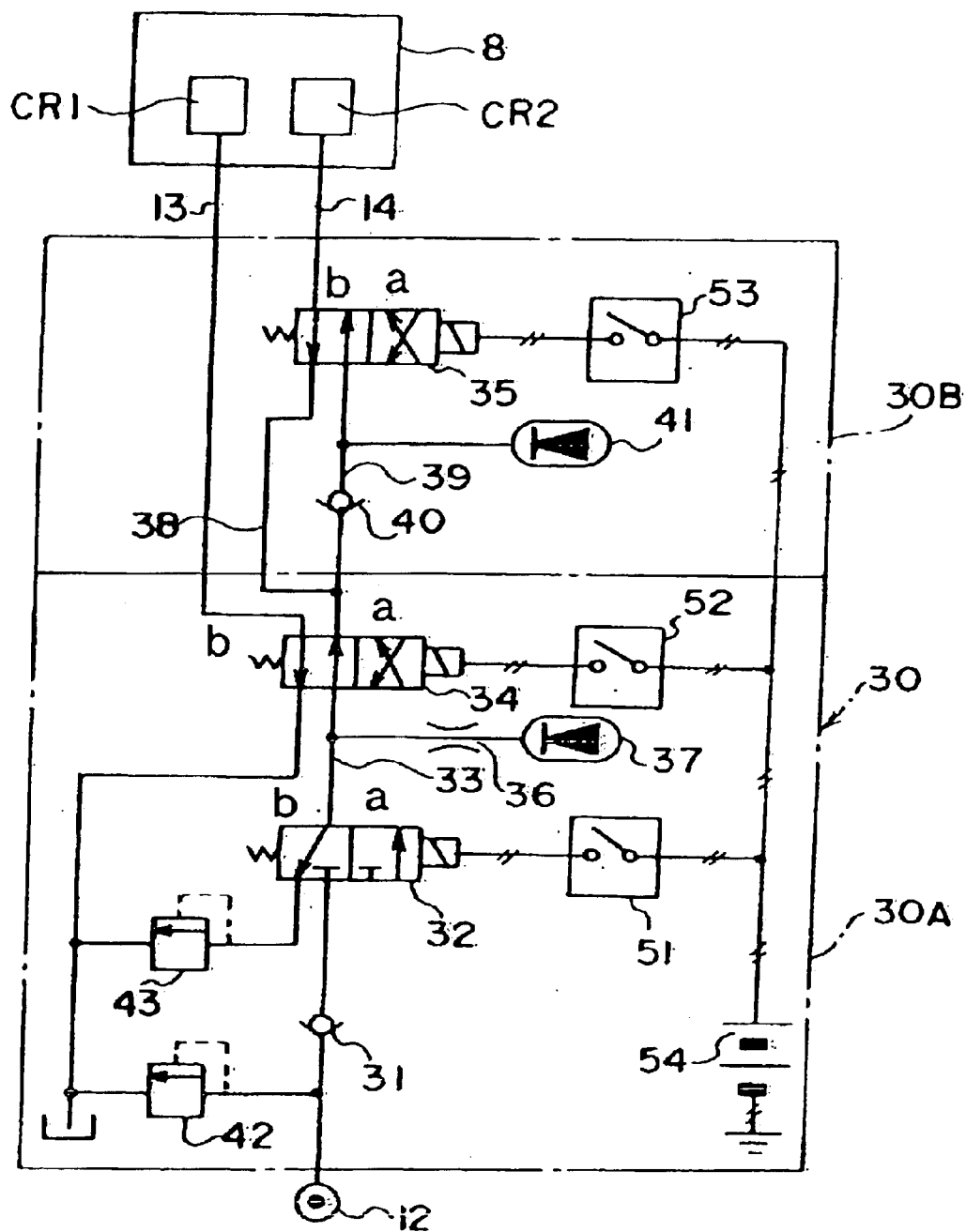
FIG. 2 is a hydraulic circuit diagram showing the structure of a parking brake unit of a first embodiment.

FIG. 2 is a hydraulic circuit diagram showing the structure of the transmission control valve 30. As shown in FIG. 2, the transmission control valve 30 has a transmission control unit 30A for controlling drive of the transmission 8 and a brake release unit 30B for releasing the parking brake when the engine is stopped.

Pressure oil from the hydraulic power source 12 is guided through a check valve 31 to a solenoid switching valve 32. Pressure oil passing through the solenoid switching valve 32 is guided to a solenoid switching valve 34 (gear ratio control valve) through a pipeline 33. Pressure oil passing through the solenoid switching valve 34 is guided to the clutch device CR1 via a pipeline 13 or to the clutch device CR2 via a solenoid switching valve 35 (control valve) and a pipeline 14. An accumulator 37 is connected to the pipeline 33 via a restrictor 36.

A pipeline connected to the solenoid switching valve 34 and going towards the solenoid switching valve 35 branches into two. One pipeline 38 is connected directly to the solenoid switching valve 35, while the other pipeline 39 is connected to the solenoid switching valve 35 via a check valve 40. An accumulator 41 is connected to the pipeline 39 between the check valve 40 and the solenoid switching valve 35.

A transmission drive switch 51, a gear change switch 52 and a parking brake release switch 53 are respectively provided inside the operator's cabin 85. These switches 51–53 are respectively connected between the solenoids of the solenoid switching valves 32, 34 and 35 and a power source 54. The solenoid switching valves 32, 34 and 35 are respectively switched in response to operation of the switches 51–53. If an engine start keyswitch (not shown) is turned on, it becomes possible to supply electricity from the power source 54, while it is prevented from supplying electricity from the power source 54 if the keyswitch is turned off.

Next, characteristic operations of the first embodiment will be described.

(1) First Gear Travel

When causing the vehicle to travel in first gear, first of all, the keyswitch is turned on so that a starter is driven to start the engine 1. The switches 51 and 52 are then turned on and the switch 53 is turned off. As a result, the solenoid switching valves 32 and 34 are switched to position a and the solenoid switching valve 35 is switched to position b. As a result of this switching, hydraulic pressure from the hydraulic source 12 regulated by the relief valve 42 passes through the check valve 31, solenoid switching valve 32, pipeline 33, solenoid switching valve 34 and pipeline 13 and acts on the clutch device CR1. At the same time, pressure oil that has acted on the clutch device CR2 passes through the pipeline 14, solenoid switching valve 35, pipeline 38 and solenoid switching valve 34, and is finally collected in a reservoir. As a result, the clutch device CR1 is set to the released state and the clutch device CR2 is set to the engaged state and the gear ratio of the transmission 8 is set to a gear ratio R1 with low-speed high-torque.

With the clutch device CR1 in the released state and the clutch device CR2 in the engaged state, the operator switches the operating lever 21 to the forward side or the reverse side, and presses the accelerator pedal 17 down. The control valve 3 is switched in response to the operating direction of the operating lever 21 and extent of depression of the accelerator pedal 17 and pressure oil from the hydraulic pump 2 is supplied to the hydraulic motor 7 to enable first gear travel of the vehicle. If the solenoid switching valve 32 is switched to position a, pressure oil from the hydraulic source 12 is accumulated in the accumulator 37.

(2) Second Gear Travel

When causing the vehicle to travel in second gear, the switch 52 is turned off from the above described condition. As a result, the solenoid switching valve 34 is switched to position b and hydraulic pressure from the hydraulic source 12 acts on the clutch device CR2, while pressure oil that has acted on the clutch device CR1 is collected in the reservoir. As a result, the clutch device CR1 is set to the engaged state and the clutch device CR2 is set to the released state and the gear ratio of the transmission 8 is set to a gear ratio R2 with high-speed low-torque. This enables the vehicle to travel in second gear. At this time, pressure oil from the hydraulic source 12 is accumulated in the accumulator 41 via the check valve 40.

If the brake pedal 22 is operated during traveling, hydraulic pressure corresponding to the extent to which the brake pedal 22 is operated is generated or output from the brake valve 25. The foot brake is activated by this hydraulic pressure to reduce the speed of the vehicle.

(3) Parking Brake Operation

When engaging the parking brake to operate, the vehicle is stopped and the switch 51 is turned off. Accordingly the solenoid switching valve 32 is switched to position b, and pressure oil that was acting on either clutch device CR1 or CR2 passes through the solenoid switching valve 34, pipeline 33, solenoid switching valve 32 and relief valve 43 to be collected in the reservoir. At this time, pressure oil accumulated in the accumulator 37 is guided to the pipeline 33 via the restrictor 36. In this way, pressure oil that was acting on the clutch device CR1 or CR2 is gradually reduced, thus preventing sudden operation of the parking brake.

When a specified time has elapsed after turning the switch 51 off, hydraulic pressure that was acting on either the clutch device CR1 or the clutch device CR2 is reduced to a specified value or less and the clutch devices CR1 and CR2 both become engaged. Accordingly, the transmission 8 is locked and the parking brake is operated. It is to be noted that pressure oil acting on the clutch devices CR1 and CR2 works as a brake release pressure. That is, if supply of brake release pressure is stopped, the transmission 8 acts as a parking brake.

If the keyswitch is turned off to stop the engine, supply of electricity from the power source 54 is cut off and the solenoid switching valves 32, 34 and 35 are respectively switched to position b regardless of operation of the switches 51–53. Therefore, similarly to as described previously, pressure oil that was acting on the clutch devices CR1 and CR2 is reduced gradually. After a specified time the clutch devices CR1 and CR2 become engaged, and the parking brake is automatically operated.

Even if the engine is stopped and the parking brake is in an operated state, specified pressure oil remains accumulated in the accumulator 41. This is caused because the upstream side and the downstream side of the accumulator 41 are respectively blocked by the check valve 40 and the solenoid switching valve 35. The upstream side indicates the hydraulic source 12 side and the downstream side indicates the transmission 8 side. If the brake pedal 22 is pressed down, pressure oil accumulated in the accumulator 26 acts on a brake cylinder for foot brake etc. As a result, it is possible to cause the foot brake to operate for a specified time even if the engine is stopped.

(4) Parking Brake Release

For releasing the parking brake while the engine is stopped, first of all, the keyswitch is turned on. At this time, it is not necessary to drive the starter as long as electricity is supplied from the power source 54 to the parking brake release switch 53. Next, the switch 53 is turned on. Accordingly, the solenoid switching valve 35 is switched to position a, and pressure oil accumulated in the accumulator 41 acts on the clutch device CR2 via the solenoid switching valve 35. The clutch device CR2 is set to the released state and the parking brake is released. As a result, it is possible to tow the vehicle. In this case, if the vehicle is towed, the hydraulic motor for traveling 7 is caused to rotate. Therefore, a resistive force is exerted due to the pump operation of the hydraulic motor 7, but since the clutch device CR2 is released, the transmission 8 is in the second gear state with small resistive force, accordingly, it is possible to perform towing operation easily.

As has been described above, according to the first embodiment, the accumulator 41 is connected to the pipeline 14 through which pilot pressure for parking brake release passes. Furthermore, the upstream side and downstream side of the accumulator 41 are respectively blocked by the check valve 40 and the solenoid switching valve 35 to hold pressure oil in the accumulator 41. Accordingly, even if the engine is stopped pressure oil is made to act from the accumulator 41 on the clutch device CR2 by switching the solenoid switching valve 35 though switch operation performed in the operator's cabin and the parking brake is thus released. Moreover, since the transmission 8 is endowed with the function of a negative parking brake, it is not necessary to provide a dedicated parking brake separately, thus reducing the number of components.

The parking brake unit 30B is provided between the transmission 8 and the transmission controller 30A. Specifically, the accumulator 41 is provided more to the downstream side than the solenoid switching valves 32 and 34 and the accumulator 37, therefore, it is possible to reduce the size of the accumulator 41 for the following reasons. For example, if the accumulator 41 is provided at an upstream side (for example, between the solenoid switching valve 32 and the check valve 31), pressure oil from that accumulator at the time of parking brake release is also guided to the accumulator 37. Therefore a large capacity would be required for the accumulator to take into account the amount of pressure oil guided to the accumulator 37. However, with this embodiment it is possible to minimize the accumulator 41 because the accumulator 41 is provided at the downstream side and pressure oil is not guided to the accumulator 37.

The accumulator 41 is allowed to be connected with the pipeline 14 for guiding control pressure to the clutch device CR2 for second gear so that the transmission 8 is put into the second gear state at the time of parking brake release. If the transmission 8 is in the second gear state, torque for driving the hydraulic motor 7 is small compared to the first gear state and a towing operation is performed easily.

Second Embodiment

Figure 3:
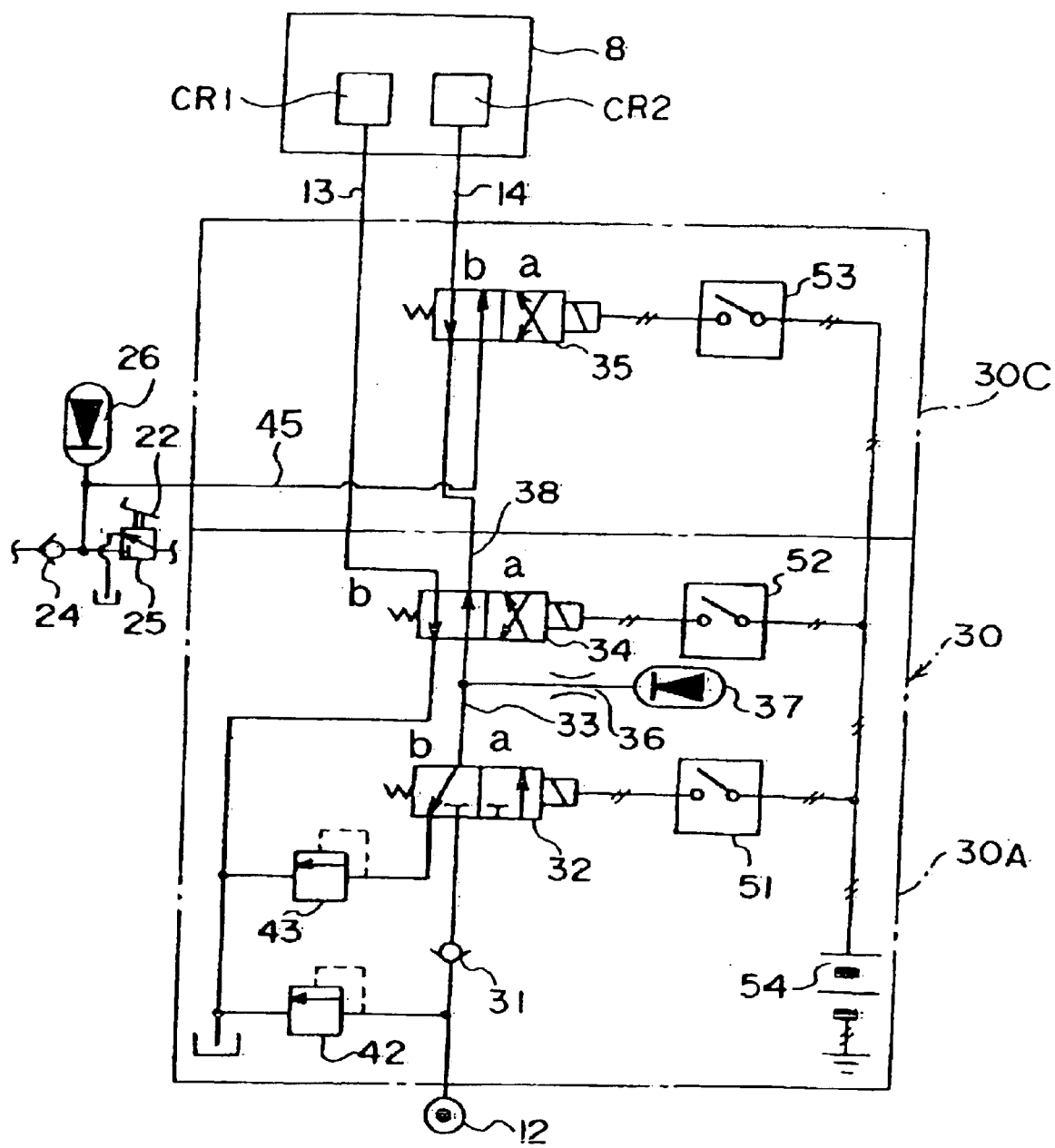
FIG. 3 is a hydraulic circuit diagram showing the structure of a parking brake unit of a second embodiment.

A second embodiment of the present invention will now be described using FIG. 3. FIG. 3 is a hydraulic circuit diagram showing the structure of a transmission control valve 30 of the second embodiment of the present invention. Elements identical to that shown FIG. 2 have the same reference numerals, and the following description will focus on points different from FIG. 2.

A transmission control valve 30 comprises a transmission control unit 30A and a brake release unit 30C. As shown in FIG. 3, the structure of the brake release unit 30C is different from that of the first embodiment.

An accumulator 26 for the footbrake is connected to the solenoid switching valve 35 through the pipeline 45. Accordingly, when the engine is stopped, if the parking brake release switch 53 is turned on as described above, pressure oil from the accumulator 26 is guided to the clutch device CR2 and the parking brake is released.

As described above, with the second embodiment, the accumulator 26 for the foot brake and the solenoid switching valve 35 are connected with each other via the pipeline 45. The parking brake is then released using the pressure oil accumulated in the accumulator 26. It is therefore not necessary to separately provide the accumulator 41 and check valve 40 etc., and it is possible to reduce the number of components.

The present invention is directed to release the parking brake using pressure oil from the accumulator 41 when the engine is stopped, by connecting an accumulator 41 to a pipeline 14 for guiding brake release pressure and then, and this is not limited to the above described embodiments and various modifications can be made. For example, with the above described embodiments the transmission 8 is used to achieve the function of a parking brake, but it is also possible to provide an independent negative parking brake separate from the transmission 8, and to release this parking brake using pressure oil from the accumulator 41.

Furthermore, the accumulator 41 has been provided at a downstream side of the solenoid switching valves 32 and 34 and the accumulator 37, but may also be provided at an upstream side. Likewise, the accumulator 41 has been connected to the control pipeline 14 of the clutch device CR2 for second gear, but it may also be connected to the control pipeline 13 of the clutch device CR1 for first gear. If the accumulator 41 is connected to the pipeline 13, the solenoid switching valve 35 and the check valve 40 will also be connected to the pipeline 13.

It is also possible to connect the accumulator 41 to both of the pipelines 13 and 14 and have pressure oil flow through either the pipeline 13 or the pipeline 14 selectively. In this case, the pipeline 39 connected with the accumulator 41 may be selectively connected to either the pipeline 13 or the pipeline 14 using a solenoid switching valve or the like. In this manner, it is possible to select the gear ratio at the time of a towing operation. For example, in the case of towing the vehicle going downhill, by having pressure oil flow into the pipeline 13, a towing operation can be performed slowly owing to the resistive force generated by the hydraulic motor 7.

The present invention may also be applied to work vehicles other than a wheeled hydraulic excavator, and also to automatic vehicles.

Advantages obtained by the parking brake used for a work vehicle of the present invention described above will now be described.

(1) If a release command is output in response to operation of the switch 53, being an operating member, in the operator's cabin, the solenoid switching valve 35 (control valve) allows oil accumulated in the accumulators 41 and 26 to flow, and guides brake release pressure to the parking brake 8. By forming the brake release means 30B and 30C in this manner, it is possible to easily release the parking brake through an operation performed in the operator's cabin even if the engine is stopped.

(2) The parking brake is constituted of a transmission 8 having a first clutch device CR1 and a second clutch device CR2. If the brake release command is output, pressure oil is guided to the first clutch device CR1 or the second clutch device CR2 in order to release a locked state of the transmission 8. In this manner, it is not necessary to provide the parking brake separately. Also, a second gear ratio set in the second clutch device CR2 is smaller than a first gear ratio set in the first clutch device CR1. If the brake release command is output, pressure oil is guided to the second clutch device CR2. As a result, the gear ratio of the transmission 8 is set to the second gear ratio and drive torque of the motor at the time of parking brake release is set small so that a towing operation can be performed easily.

(3) The brake release means 30B and 30C are provided between the parking brake 8 and the transmission control means 30A. As a result, pressure oil is not guided from the accumulators 41, 26 of the brake release means 30B, 30C towards the transmission control means 30A, therefore, it is possible to minimize the brake release accumulator.

(4) The check valve 40 (prevention means) prevents pressure oil accumulated in the accumulator 41 flowing out to the hydraulic source 12 side. In this way, pressure oil of the accumulator 41 is reliably guided to the parking brake 8 as parking brake release pressure.

(5) Since pressure oil from the foot brake accumulator 26 is used as release pressure for the parking brake, it is possible to reduce the number of components.

What is claimed is:

1. A parking brake unit for a work vehicle, comprising:
   a hydraulic source;
   a negative parking brake provided a lower portion of the vehicle, that releases brake operation in response to brake release pressure;
   an operating member that outputs a release command for the parking brake in response to an operation performed in an operator's cabin;
   a brake release device that releases operation of the parking brake by leading the brake release pressure to the parking brake if the release command is output; and
   a transmission control device; wherein:
   the parking brake is constituted of a transmission having a negative first clutch device and a negative second clutch device,
   the transmission sets a first gear ratio by allowing a propeller shaft to rotate if the first clutch device is released by control pressure for clutch release, and sets a second gear ratio smaller than the first gear ratio by allowing the propeller shaft to rotate if the second clutch device is released by the control pressure for clutch release,
   the brake release device comprises
   a brake release accumulator that accumulates pressure oil from the hydraulic source, and a control valve that allows the pressure oil accumulated in the brake release accumulator to act on the second clutch device as the brake release pressure if the release command is output,
   the transmission control device comprises a sear ratio control valve that controls flow of the control pressure for clutch release for acting on the first clutch device and the second clutch device, and a sudden operation prevention accumulator that prevents sudden operation of the parking brake, and
   the brake release device is provided between the parking brake and the transmission control device.

2. A parking brake unit for a work vehicle according to claim 1, wherein:
   the brake release device further comprises a prevention device that prevents the pressure oil accumulated in the brake release accumulator flowing out to the hydraulic power side.

3. A parking brake unit for a work vehicle according to claim 1, further comprising:
   a brake valve that generates brake operating pressure in correspondence with operation of a brake pedal;
   a foot brake unit that operates in response to the brake operating pressure; and
   a foot brake accumulator that accumulates specified pressure oil in order to generate the brake operating pressure in accordance with operation of the brake pedal when an engine is stopped,
   wherein the foot brake accumulator also functions as the brake release accumulator.

4. A parking brake unit for a work vehicle, comprising:
   a hydraulic source;
   a negative parking brake provided a lower portion of the vehicle, that releases brake operation in response to brake release pressure;
   an operating member that outputs a release command for the parking brake in response to an operation performed in an operator's cabin;
   a brake release device that releases operation of the parking brake by leading the brake release pressure to the parking brake if the release command is output; and
   a transmission control device, wherein:
   the parking brake is constituted of a transmission having a negative first clutch device and a negative second clutch device,
   the transmission sets a first gear ratio by allowing a propeller shaft to rotate if the first clutch device is released by control pressure for clutch release, and sets a second gear ratio smaller than the first gear ratio by allowing the propeller shaft to rotate if the second clutch device is released by the control pressure for clutch release,
   the brake release device comprises
   a brake release accumulator that accumulates pressure oil from the hydraulic source, and a control valve that allows the pressure oil accumulated in the brake release accumulator to act on the first clutch device as the brake release pressure if the release command is output,
   the transmission control device comprises a gear ratio control valve that controls flow of the control pressure for clutch release for acting on the first clutch device and the second clutch device, and a sudden operation prevention accumulator that prevents sudden operation of the parking brake, and
   the brake release device is provided between the parking brake and the transmission control device.

5. A parking brake unit for a work vehicle according to claim 4, wherein:
   the brake release device further comprises a prevention device that prevents the pressure oil accumulated in the brake release accumulator flowing out to the hydraulic power side.

6. A parking brake unit for a work vehicle according to claim 4, further comprising:
   a brake valve that generates brake operating pressure in correspondence with operation of a brake pedal;
   a foot brake unit that operates in response to the brake operating pressure; and
   a foot brake accumulator that accumulates specified pressure oil in order to generate the brake operating pressure in accordance with operation of the brake pedal when an engine is stopped, wherein:
   the foot brake accumulator also functions as the brake release accumulator.

7. A parking brake unit for a work vehicle, comprising:
   a hydraulic source;
   a negative parking brake provided a lower portion of the vehicle, that releases brake operation in response to brake release pressure;
   an operating member that outputs a release command for the parking brake in response to an operation performed in an operator's cabin;
   a brake release device that releases operation of the parking brake by leading the brake release pressure to the parking brake if the release command is output; and a transmission control device, wherein:
- the parking brake is constituted of a transmission having a negative first clutch device and a negative second clutch device,
- the transmission sets a first gear ratio by allowing a propeller shaft to rotate if the first clutch device is released by control pressure for clutch release, and sets a second gear ratio smaller than the first gear ratio by allowing the propeller shaft to rotate if the second clutch device is released by the control pressure for clutch release,
- the brake release device comprises
  - a brake release accumulator that accumulates pressure oil from the hydraulic source, and a control valve that allows the pressure oil accumulated in the brake release accumulator to act on one of the first clutch device and the second clutch device as the brake release pressure if the release command is output,
  - the transmission control device comprises a gear ratio control valve that controls flow of the control pressure for clutch release for acting on the first clutch device and the second clutch device, and a sudden operation prevention accumulator that prevents sudden operation of the parking brake, and
  - the brake release device is provided between the parking brake and the transmission control device.

8. A parking brake unit for a work vehicle according to claim 7, wherein:
- the brake release device further comprises a prevention device that prevents the pressure oil accumulated in the brake release accumulator flowing out to the hydraulic power side.

9. A parking brake unit for a work vehicle according to claim 7, further comprising:
- a brake valve that generates brake operating pressure in correspondence with operation of a brake pedal;
- a foot brake unit that operates in response to the brake operating pressure; and
- a foot brake accumulator that accumulates specified pressure oil in order to generate the brake operating pressure in accordance with operation of the brake pedal when an engine is stopped, wherein:
  - the foot brake accumulator also functions as the brake release accumulator.

\* \* \* \* \*